(12) United States Patent
Lee

(10) Patent No.: US 11,279,629 B2
(45) Date of Patent: Mar. 22, 2022

(54) ARTIFICIAL INTELLIGENCE WATER PURIFIER

(71) Applicant: LG ELECTRONICS INC., Seoul (KR)

(72) Inventor: Jonhwey Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 42 days.

(21) Appl. No.: 16/804,574

(22) Filed: Feb. 28, 2020

(65) Prior Publication Data

US 2021/0171363 A1    Jun. 10, 2021

(30) Foreign Application Priority Data

Dec. 4, 2019    (KR) .......................... 10-2019-0159507

(51) Int. Cl.
*C02F 1/00* (2006.01)

(52) U.S. Cl.
CPC .............. *C02F 1/008* (2013.01); *C02F 1/003* (2013.01)

(58) Field of Classification Search
None
See application file for complete search history.

(56) References Cited

U.S. PATENT DOCUMENTS

| 2005/0139530 A1* | 6/2005 | Heiss ........................ C02F 9/00 210/85 |
| 2017/0183243 A1* | 6/2017 | Reitmeyer ................ E03F 7/02 |

* cited by examiner

*Primary Examiner* — Richard C Gurtowski
(74) *Attorney, Agent, or Firm* — Birch, Stewart, Kolasch & Birch, LLP

(57) ABSTRACT

Disclosed is an artificial intelligence (AI) water purifier. The AI water purifier includes a housing forming an outer surface of the AI water purifier, a filter assembly disposed inside the housing, a water outlet for discharging water, a water supply pipe for connecting a water source to the filter assembly, a water discharge pipe for connecting the filter assembly to the water outlet, a first camera for capturing an image of water passing through the water supply pipe, and a processor for acquiring at least one of transparency or color of the water passing through the water supply pipe using the image captured, and for determining a pollution level of the water passing through the water supply pipe using at least one of the transparency or the color.

18 Claims, 12 Drawing Sheets

FIG. 7
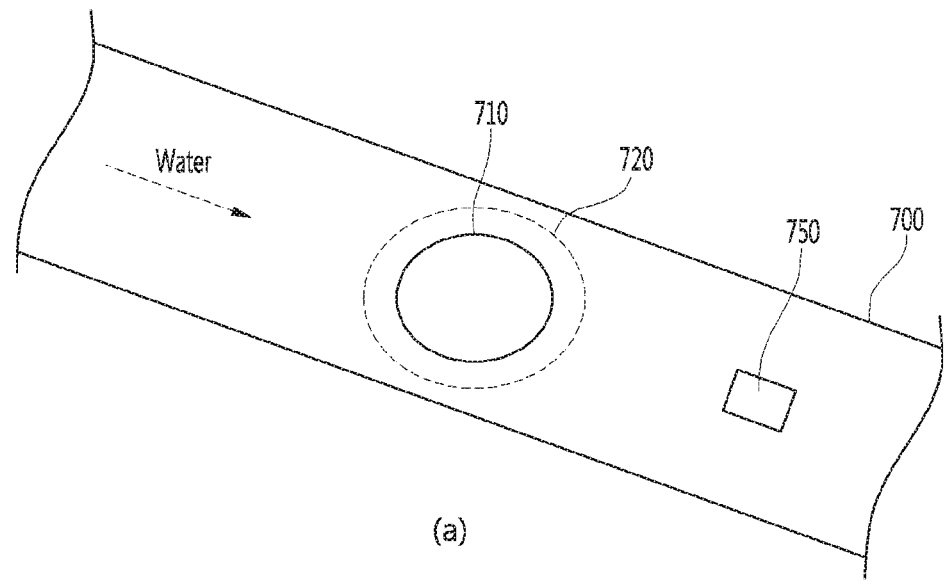
(a)
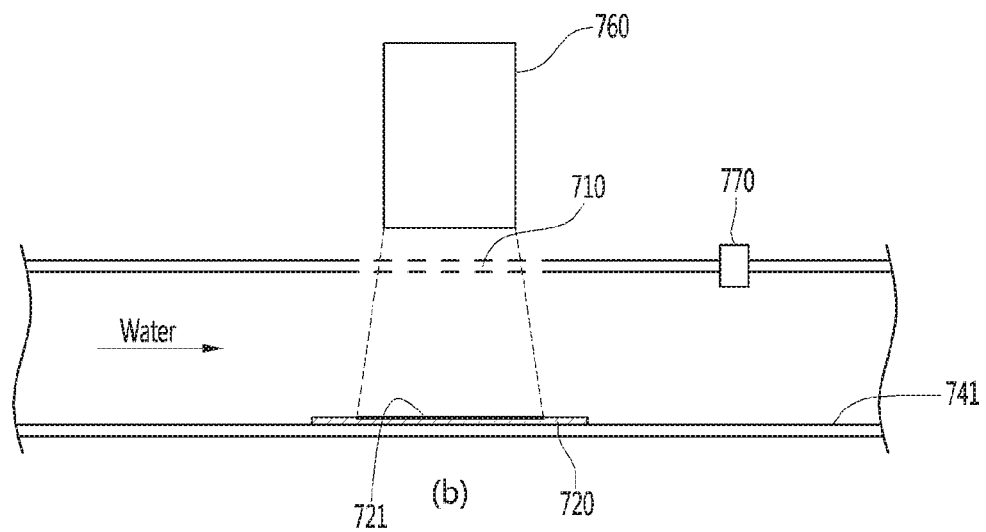
(b)

FIG. 9
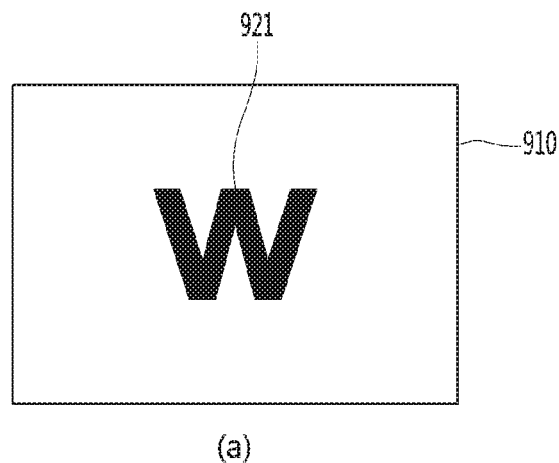
(a)
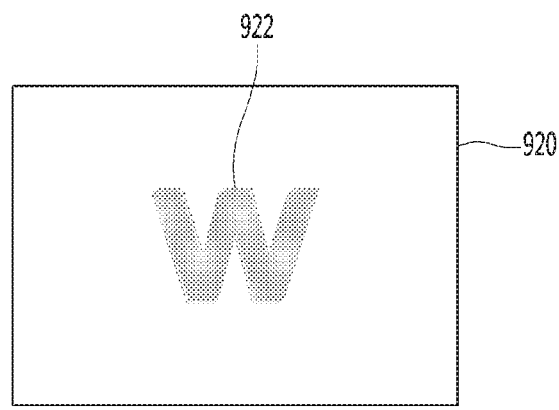
(b)

FIG. 10
(a)
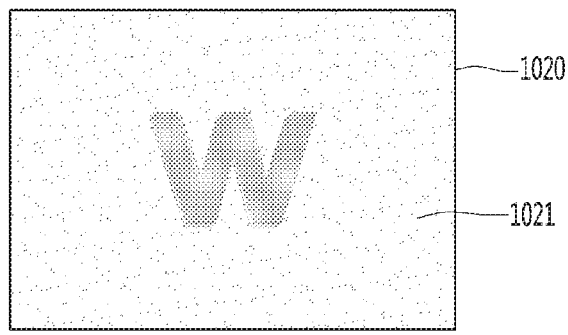
(b)

FIG. 11
(a)
(b)

ARTIFICIAL INTELLIGENCE WATER PURIFIER

CROSS-REFERENCE TO RELATED APPLICATIONS

This application claims priority under 35 U.S.C. 119 and 365 to Korean Patent Application No. 10-2019-0159507, filed on Dec. 4, 2019 in the Korean Intellectual Property Office, the disclosure of which is incorporated herein by reference.

FIELD OF INVENTION

The present disclosure relates to a water purifier for photographing water passing a water supply pipe and recognizing a pollution level of water using an image captured by photographing water.

BACKGROUND

Artificial intelligence refers to one field of computer engineering and information technology of studying a method for making a computer think, learn, and do self-improvement, which is achieved based on human intelligence, and means that a computer emulates an intelligent behavior of the human.

AI is largely related directly and indirectly to other fields of a computer science rather than existing itself. In particular, AI elements have been modernly introduced in various fields of information technology, and there has been an active attempt to use AI to overcome problems of the fields.

Research has been actively conducted into context awareness technology of recognizing a situation of a user and providing information desired by the user in a desired form using AI.

In addition, an electronic device for providing various operations and functions can be referred to as an AI device.

A water purifier is a device for purifying impurities contained in water or harmful materials such as heavy metal using a physical and/or chemical method.

A currently available water purifier operates without checking water quality. Thus, when water supply is suddenly contaminated due to rust or the like, the lifespan of a filter is largely reduced, and unpurified water is discharged.

SUMMARY OF THE INVENTION

An object of the present disclosure is to provide an artificial intelligence (AI) water purifier for photographing water passing a water supply pipe and recognizing a pollution level of water using an image captured by photographing water.

According to an embodiment, an artificial intelligence (AI) water purifier includes a housing forming an outer surface of the AI water purifier, a filter assembly disposed inside the housing, a water outlet configured to discharge water, a water supply pipe configured to connect a water source and the filter assembly, a water discharge pipe configured to connect the filter assembly and the water outlet, a first camera configured to photograph water passing through the water supply pipe, and a processor configured to acquire at least one of transparency or color of the water passing through the water supply pipe using an image captured by photographing the water passing through the water supply pipe, and to determine a pollution level of the water passing through the water supply pipe using at least one of the transparency or the color.

BRIEF DESCRIPTION OF THE DRAWINGS

FIG. 7 is a view for explaining a water supply pipe and a supplied water quality management module;

FIGS. 9 to 11 are views for explaining a method of determining a pollution level using an image captured by photographing water;

DETAILED DESCRIPTION

Figure 1:
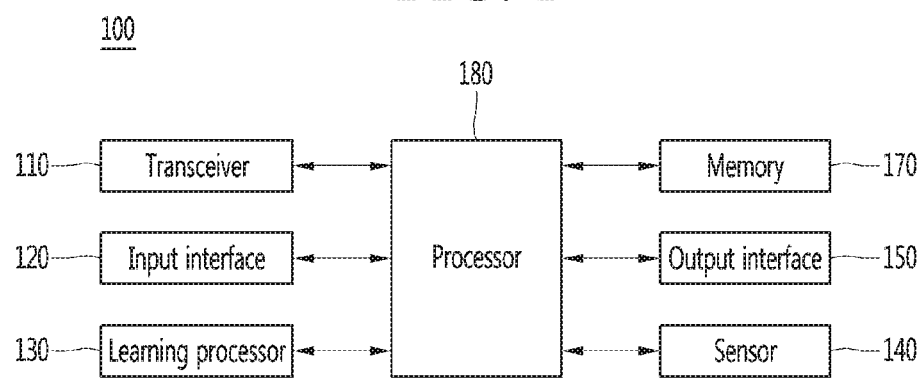
FIG. 1 illustrates an artificial intelligence (AI) device according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial Intelligence (AI)

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

Robot

A robot can refer to a machine that automatically processes or operates a given task by its own ability. In particular, a robot having a function of recognizing an environment and performing a self-determination operation can be referred to as an intelligent robot.

Robots can be classified into industrial robots, medical robots, home robots, military robots, and the like according to the use purpose or field.

The robot includes a driving unit can include an actuator or a motor and can perform various physical operations such as moving a robot joint. In addition, a movable robot can include a wheel, a brake, a propeller, and the like in a driving unit, and can travel on the ground through the driving unit or fly in the air.

Self-Driving

Self-driving refers to a technique of driving for oneself, and a self-driving vehicle refers to a vehicle that travels without an operation of a user or with a minimum operation of a user.

For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can include a vehicle having only an internal combustion engine, a hybrid vehicle having an internal combustion engine and an electric motor together, and an electric vehicle having only an electric motor, and can include not only an automobile but also a train, a motorcycle, and the like.

At this time, the self-driving vehicle can be regarded as a robot having a self-driving function.

eXtended Reality (XR)

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology can be applied to a head-mount display (HMD), a head-up display (HUD), a mobile phone, a tablet PC, a laptop, a desktop, a TV, a digital signage, and the like. A device to which the XR technology is applied can be referred to as an XR device.

FIG. 1 illustrates an AI device 100 according to an embodiment of the present disclosure.

The AI device 100 can be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 can include a transceiver 110, an input interface 120, a learning processor 130, a sensor 140, an output interface 150, a memory 170, and a processor 180.

The transceiver 110 can transmit and receive data to and from external devices such as other AI devices 100a to 100e and the AI server 200 by using wire/wireless communication technology. For example, the transceiver 110 can transmit and receive sensor information, a user input, a learning model, and a control signal to and from external devices.

The communication technology used by the transceiver 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 can acquire various kinds of data.

At this time, the input interface 120 can include a camera for inputting a video signal, a microphone for receiving an audio signal, and a user input interface for receiving information from a user. The camera or the microphone can be treated as a sensor, and the signal acquired from the camera or the microphone can be referred to as sensing data or sensor information.

The input interface 120 can acquire a learning data for model learning and an input data to be used when an output is acquired by using learning model. The input interface 120 can acquire raw input data. In this case, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

At this time, the learning processor 130 can perform AI processing together with the learning processor 240 of the AI server 200.

At this time, the learning processor 130 can include a memory integrated or implemented in the AI device 100. Alternatively, the learning processor 130 can be implemented by using the memory 170, an external memory directly connected to the AI device 100, or a memory held in an external device.

The sensor 140 can acquire at least one of internal information about the AI device 100, ambient environment information about the AI device 100, and user information by using various sensors.

Examples of the sensors included in the sensor 140 can include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 can generate an output related to a visual sense, an auditory sense, or a haptic sense.

At this time, the output interface 150 can include a display unit for outputting time information, a speaker for outputting auditory information, and a haptic module for outputting haptic information.

The memory 170 can store data that supports various functions of the AI device 100. For example, the memory 170 can store input data acquired by the input interface 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire intention information for the user input and can determine the user's requirements based on the acquired intention information.

The processor 180 can acquire the intention information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200, or can be learned by their distributed processing.

The processor 180 can collect history information including the operation contents of the AI apparatus 100 or the user's feedback on the operation and can store the collected history information in the memory 170 or the learning processor 130 or transmit the collected history information to the external device such as the AI server 200. The collected history information can be used to update the learning model.

The processor 180 can control at least part of the components of AI device 100 so as to drive an application program stored in memory 170. Furthermore, the processor 180 can operate two or more of the components included in the AI device 100 in combination so as to drive the application program.

Figure 2:
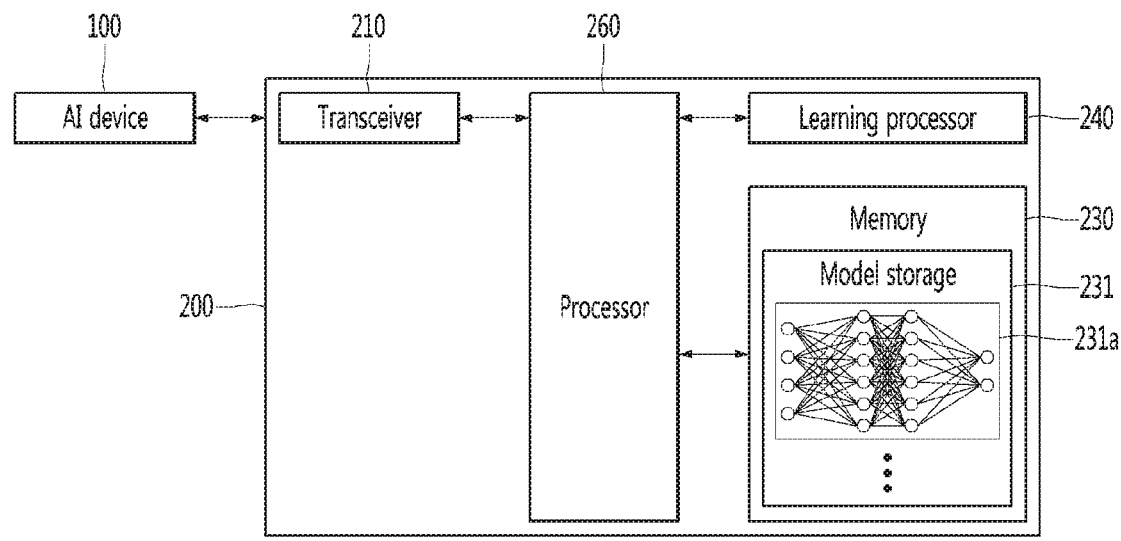
FIG. 2 illustrates an AI server according to an embodiment of the present disclosure.

FIG. 2 illustrates an AI server 200 according to an embodiment of the present disclosure.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network. At this time, the AI server 200 can be included as a partial configuration of the AI device 100, and can perform at least part of the AI processing together.

The AI server 200 can include a transceiver 210, a memory 230, a learning processor 240, a processor 260, and the like.

The transceiver 210 can transmit and receive data to and from an external device such as the AI device 100.

The memory 230 can include a model storage unit 231. The model storage unit 231 can store a learning or learned model (or an artificial neural network 231a) through the learning processor 240.

The learning processor 240 can learn the artificial neural network 231a by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or some of the learning models are implemented in software, one or more instructions that constitute the learning model can be stored in memory 230.

The processor 260 can infer the result value for new input data by using the learning model and can generate a response or a control command based on the inferred result value.

Figure 3:
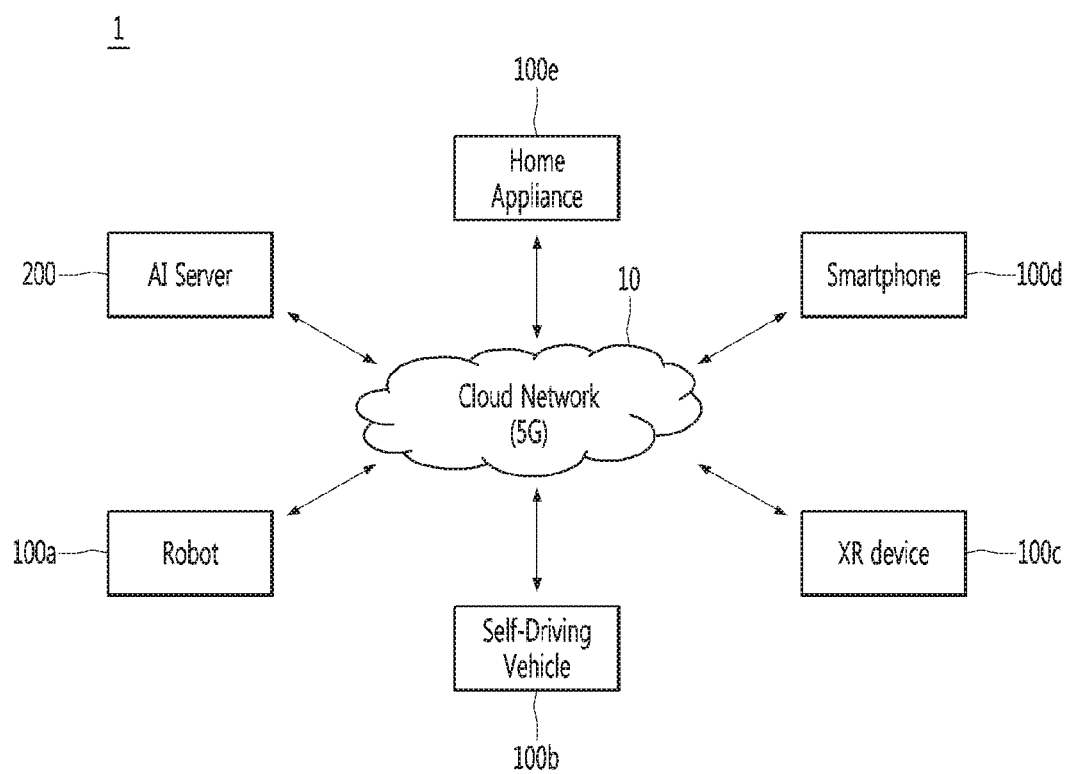
FIG. 3 illustrates an AI system according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e.

The cloud network 10 can refer to a network that forms part of a cloud computing infrastructure or exists in a cloud computing infrastructure. The cloud network 10 can be configured by using a 3G network, a 4G or LTE network, or a 5G network.

That is, the devices 100a to 100e and 200 configuring the AI system 1 can be connected to each other through the cloud network 10. In particular, each of the devices 100a to 100e and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100a, the self-driving vehicle 100b, the XR device 100c, the smartphone 100d, or the home appliance 100e through the cloud network 10, and can assist at least part of AI processing of the connected AI devices 100a to 100e.

At this time, the AI server 200 can learn the artificial neural network according to the machine learning algorithm instead of the AI devices 100a to 100e, and can directly store the learning model or transmit the learning model to the AI devices 100a to 100e.

At this time, the AI server 200 can receive input data from the AI devices 100a to 100e, can infer the result value for the received input data by using the learning model, can generate a response or a control command based on the inferred result value, and can transmit the response or the control command to the AI devices 100a to 100e.

Alternatively, the AI devices 100a to 100e can infer the result value for the input data by directly using the learning model, and can generate the response or the control command based on the inference result.

Hereinafter, various embodiments of the AI devices 100a to 100e to which the above-described technology is applied will be described. The AI devices 100a to 100e illustrated in FIG. 3 can be regarded as a specific embodiment of the AI device 100 illustrated in FIG. 1.

AI+Robot

The robot 100a, to which the AI technology is applied, can be implemented as a guide robot, a carrying robot, a cleaning robot, a wearable robot, an entertainment robot, a pet robot, an unmanned flying robot, or the like.

The robot 100a can include a robot control module for controlling the operation, and the robot control module can refer to a software module or a chip implementing the software module by hardware.

The robot 100a can acquire state information about the robot 100a by using sensor information acquired from various kinds of sensors, can detect (recognize) surrounding environment and objects, can generate map data, can determine the route and the travel plan, can determine the response to user interaction, or can determine the operation.

The robot 100a can use the sensor information acquired from at least one sensor among the lidar, the radar, and the camera so as to determine the travel route and the travel plan.

The robot 100a can perform the above-described operations by using the learning model composed of at least one artificial neural network. For example, the robot 100a can recognize the surrounding environment and the objects by using the learning model, and can determine the operation by using the recognized surrounding information or object information. The learning model can be learned directly from the robot 100a or can be learned from an external device such as the AI server 200.

At this time, the robot 100a can perform the operation by generating the result by directly using the learning model, but the sensor information can be transmitted to the external device such as the AI server 200 and the generated result can be received to perform the operation.

The robot 100a can use at least one of the map data, the object information detected from the sensor information, or the object information acquired from the external apparatus to determine the travel route and the travel plan, and can control the driving unit such that the robot 100a travels along the determined travel route and travel plan.

The map data can include object identification information about various objects arranged in the space in which the robot 100a moves. For example, the map data can include object identification information about fixed objects such as walls and doors and movable objects such as pollen and desks. The object identification information can include a name, a type, a distance, and a position.

In addition, the robot 100a can perform the operation or travel by controlling the driving unit based on the control/interaction of the user. At this time, the robot 100a can acquire the intention information of the interaction due to the user's operation or speech utterance, and can determine the response based on the acquired intention information, and can perform the operation.

AI+Self-Driving

The self-driving vehicle 100b, to which the AI technology is applied, can be implemented as a mobile robot, a vehicle, an unmanned flying vehicle, or the like.

The self-driving vehicle 100b can include a self-driving control module for controlling a self-driving function, and the self-driving control module can refer to a software module or a chip implementing the software module by hardware. The self-driving control module can be included in the self-driving vehicle 100b as a component thereof, but can be implemented with separate hardware and connected to the outside of the self-driving vehicle 100b.

The self-driving vehicle 100b can acquire state information about the self-driving vehicle 100b by using sensor information acquired from various kinds of sensors, can detect (recognize) surrounding environment and objects, can generate map data, can determine the route and the travel plan, or can determine the operation.

Like the robot 100a, the self-driving vehicle 100b can use the sensor information acquired from at least one sensor among the lidar, the radar, and the camera so as to determine the travel route and the travel plan.

In particular, the self-driving vehicle 100b can recognize the environment or objects for an area covered by a field of view or an area over a certain distance by receiving the sensor information from external devices, or can receive directly recognized information from the external devices.

The self-driving vehicle 100b can perform the above-described operations by using the learning model composed of at least one artificial neural network. For example, the self-driving vehicle 100b can recognize the surrounding environment and the objects by using the learning model, and can determine the traveling movement line by using the recognized surrounding information or object information. The learning model can be learned directly from the self-driving vehicle 100a or can be learned from an external device such as the AI server 200.

At this time, the self-driving vehicle 100b can perform the operation by generating the result by directly using the learning model, but the sensor information can be transmitted to the external device such as the AI server 200 and the generated result can be received to perform the operation.

The self-driving vehicle 100b can use at least one of the map data, the object information detected from the sensor information, or the object information acquired from the external apparatus to determine the travel route and the travel plan, and can control the driving unit such that the self-driving vehicle 100b travels along the determined travel route and travel plan.

The map data can include object identification information about various objects arranged in the space (for example, road) in which the self-driving vehicle 100b travels. For example, the map data can include object identification information about fixed objects such as street lamps, rocks, and buildings and movable objects such as vehicles and pedestrians. The object identification information can include a name, a type, a distance, and a position.

In addition, the self-driving vehicle 100b can perform the operation or travel by controlling the driving unit based on the control/interaction of the user. At this time, the self-driving vehicle 100b can acquire the intention information of the interaction due to the user's operation or speech utterance, and can determine the response based on the acquired intention information, and can perform the operation.

AI+XR

The XR device 100c, to which the AI technology is applied, can be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c can analyzes three-dimensional point cloud data or image data acquired from various sensors or the external devices, generate position data and attribute data for the three-dimensional points, acquire information about the surrounding space or the real object, and render to output the XR object to be output. For example, the XR device 100c can output an XR object including the additional information about the recognized object in correspondence to the recognized object.

The XR device 100c can perform the above-described operations by using the learning model composed of at least one artificial neural network. For example, the XR device 100c can recognize the real object from the three-dimensional point cloud data or the image data by using the learning model, and can provide information corresponding to the recognized real object. The learning model can be directly learned from the XR device 100c, or can be learned from the external device such as the AI server 200.

At this time, the XR device 100c can perform the operation by generating the result by directly using the learning model, but the sensor information can be transmitted to the external device such as the AI server 200 and the generated result can be received to perform the operation.

AI+Robot+Self-Driving

The robot 100a, to which the AI technology and the self-driving technology are applied, can be implemented as a guide robot, a carrying robot, a cleaning robot, a wearable robot, an entertainment robot, a pet robot, an unmanned flying robot, or the like.

The robot 100a, to which the AI technology and the self-driving technology are applied, can refer to the robot itself having the self-driving function or the robot 100a interacting with the self-driving vehicle 100b.

The robot 100a having the self-driving function can collectively refer to a device that moves for itself along the given movement line without the user's control or moves for itself by determining the movement line by itself.

The robot 100a and the self-driving vehicle 100b having the self-driving function can use a common sensing method so as to determine at least one of the travel route or the travel plan. For example, the robot 100a and the self-driving vehicle 100b having the self-driving function can determine at least one of the travel route or the travel plan by using the information sensed through the lidar, the radar, and the camera.

The robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b.

At this time, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or can control the function of the self-driving vehicle 100b through the interaction with the user. For example, when it is determined that the driver is in a drowsy state, the robot 100a can activate the self-driving function of the self-driving vehicle 100b or assist the control of the driving unit of the self-driving vehicle 100b. The function of the self-driving vehicle 100b controlled by the robot 100a can include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide traffic information including signal information and the like, such as a smart signal, to the self-driving vehicle 100b, and automatically connect an electric charger to a charging port by interacting with the self-driving vehicle 100b like an automatic electric charger of an electric vehicle.

AI+Robot+XR

The robot 100a, to which the AI technology and the XR technology are applied, can be implemented as a guide robot, a carrying robot, a cleaning robot, a wearable robot, an entertainment robot, a pet robot, an unmanned flying robot, a drone, or the like.

The robot 100a, to which the XR technology is applied, can refer to a robot that is subjected to control/interaction in an XR image. In this case, the robot 100a can be separated from the XR device 100c and interwork with each other.

When the robot 100a, which is subjected to control/interaction in the XR image, can acquire the sensor information from the sensors including the camera, the robot 100a or the XR device 100c can generate the XR image based on the sensor information, and the XR device 100c can output the generated XR image. The robot 100a can operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

AI+Self-Driving+XR

The self-driving vehicle 100b, to which the AI technology and the XR technology are applied, can be implemented as a mobile robot, a vehicle, an unmanned flying vehicle, or the like.

The self-driving driving vehicle 100b, to which the XR technology is applied, can refer to a self-driving vehicle having a means for providing an XR image or a self-driving vehicle that is subjected to control/interaction in an XR image. Particularly, the self-driving vehicle 100b that is subjected to control/interaction in the XR image can be distinguished from the XR device 100c and interwork with each other.

The self-driving vehicle 100b having the means for providing the XR image can acquire the sensor information from the sensors including the camera and output the generated XR image based on the acquired sensor information. For example, the self-driving vehicle 100b can include an HUD to output an XR image, thereby providing a passenger with a real object or an XR object corresponding to an object in the screen.

At this time, when the XR object is output to the HUD, at least part of the XR object can be outputted so as to overlap the actual object to which the passenger's gaze is directed. Meanwhile, when the XR object is output to the display provided in the self-driving vehicle 100b, at least part of the XR object can be output so as to overlap the object in the screen. For example, the self-driving vehicle 100b can output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, can acquire the sensor information from the sensors including the camera, the self-driving vehicle 100b or the XR device 100c can generate the XR image based on the sensor information, and the XR device 100c can output the generated XR image. The self-driving vehicle 100b can operate based on the control signal input through the external device such as the XR device 100c or the user's interaction.

A water purifier is a device for purifying impurities contained in water or harmful materials such as heavy metal using a physical and/or chemical method.

Figure 4:
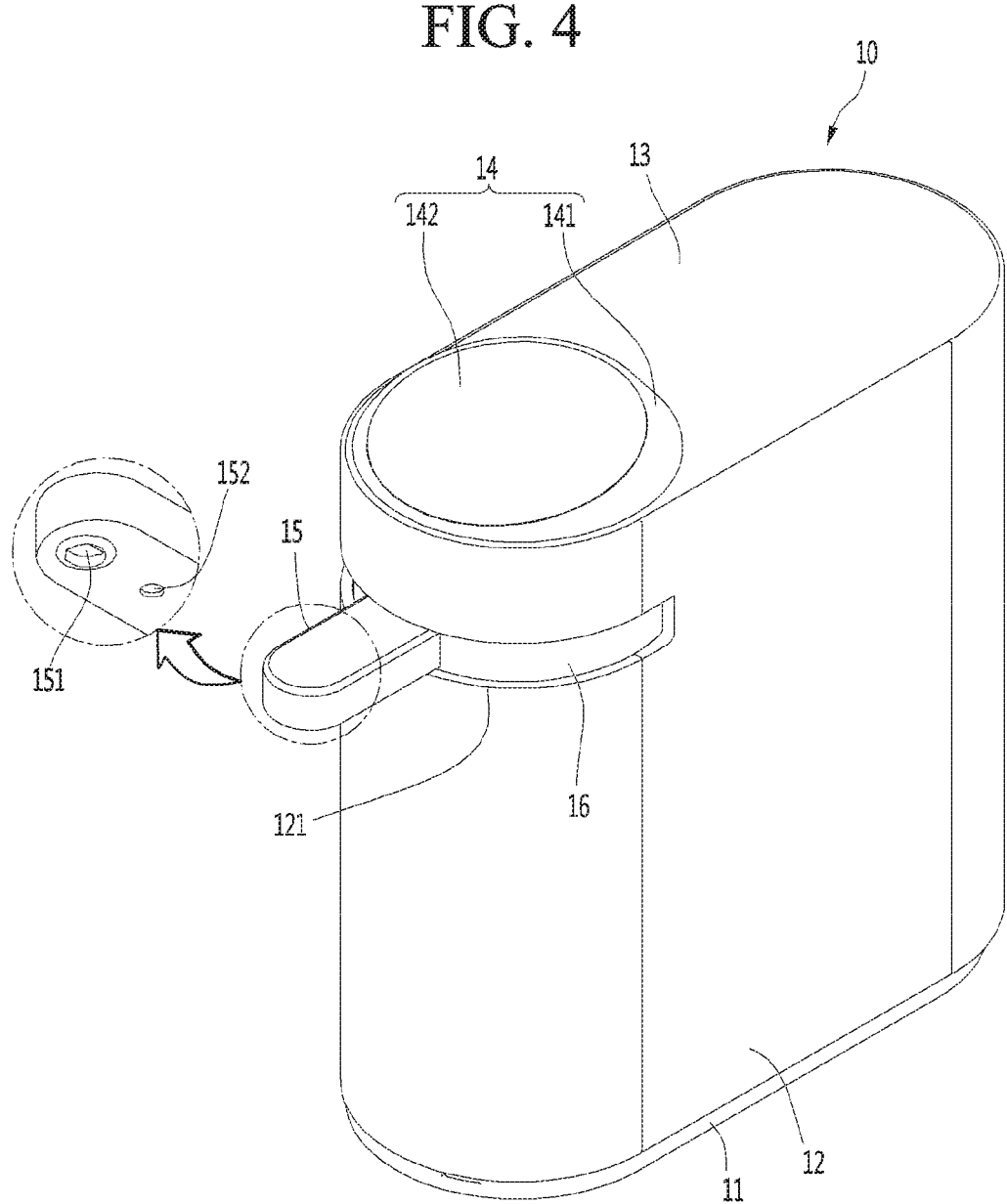
FIG. 4 is a front perspective view of a water purifier according to an embodiment of the present disclosure.

FIG. 4 is a front perspective view of a water purifier according to an embodiment of the present disclosure.

Referring to FIG. 4, a water purifier 10 can be a direct water-type cold and warm water purifier for cooling or heating water that is directly supplied from an external water source and ejecting the water.

In detail, the water purifier 10 can include a base 11 that forms a bottom portion, a housing 12 disposed on an edge of an upper surface of the base 11, a cover 13 that covers an open upper surface of the housing 12, a control panel 14 that formed on the upper surface of the cover 13, and a water chute 15 that protrudes from an outer circumference of the housing 12.

In more detail, a portion 16 on which the water chute 15 is formed can be defined as a front surface of the water purifier 10, such as a front surface of the housing 12 and an opposite surface thereto can be defined as a rear surface. A discharge grill can be formed at a lower end of the rear surface of the housing 12, and thus, air that exchanges heat with a condenser (which will be described below) installed inside the housing can be discharged out of the housing 12.

The housing 12 can form an outer surface of the water purifier.

The control panel 14 can include a panel body 141, and a panel cover 142 that cover an upper surface of the panel body 141. Holes or grooves for installing a plurality of buttons can be formed in the panel body 141, and the buttons can be installed in the holes or the grooves. Button menus corresponding to the buttons can be printed on the panel cover 142.

The water chute 15 can extend forward from the front surface of the housing 12 by a predetermined length, and can be installed to be rotatable by 90 degrees in left and right directions based on the center of a front end of the water purifier 10. That is, the water chute 15 can be rotatable by 180 degrees.

A water outlet 151 for ejecting water can be formed on a bottom surface of the water chute 15. The water outlet 151 can be formed in a single or plural number, and when a single water outlet 151 is present, a flow channel can be formed to discharge cold water, filtered water, and hot water through a single water outlet.

A sensor 152 can be installed on the bottom surface of the water chute 15, and thus when a user positions a storage container such as a cup below the water chute 15, water can be ejected.

A plurality of components such as a cold water generator for generating cold water and a refrigeration cycle for cooling can be accommodated inside the housing 12 that forms an outer appearance of the water purifier 10.

In detail, the water purifier 10 can include a compressor for compressing a refrigerant to a vapor-phase refrigerant at a high temperature and a high pressure, a condenser disposed behind the base 11 and configured to condense the refrigerant discharged from the compressor to a liquid-phase refrigerant at a high temperature and a high temperature, and a condenser fan configured to intake air of an indoor space with the water purifier 10 positioned therein and to exchange heat with the condenser.

The water purifier 10 can further include a filter assembly 17 for filtering impurities contained in water supplied from the water source. The filter assembly 17 can be disposed at a front end of the base. The filter assembly 17 can include any one or both of a pre carbon filter and an ultrafiltration filter.

The filter assembly can be installed inside the housing.

The water purifier 10 can further include an expansion side for expanding the refrigerant discharged from the condenser to a two-phase refrigerant at a low temperature and a low pressure, and an evaporator in which a two-phase refrigerant at a low temperature and a low pressure, passing through the expansion side, flows.

In detail, the water purifier 10 can further include a cold water pipe (which will be described below) in which cold water flows and a cold water generator for accommodating the evaporator therein.

The water purifier 10 can further include a hot water heater for heating supplied water at a setting temperature.

Figure 5:
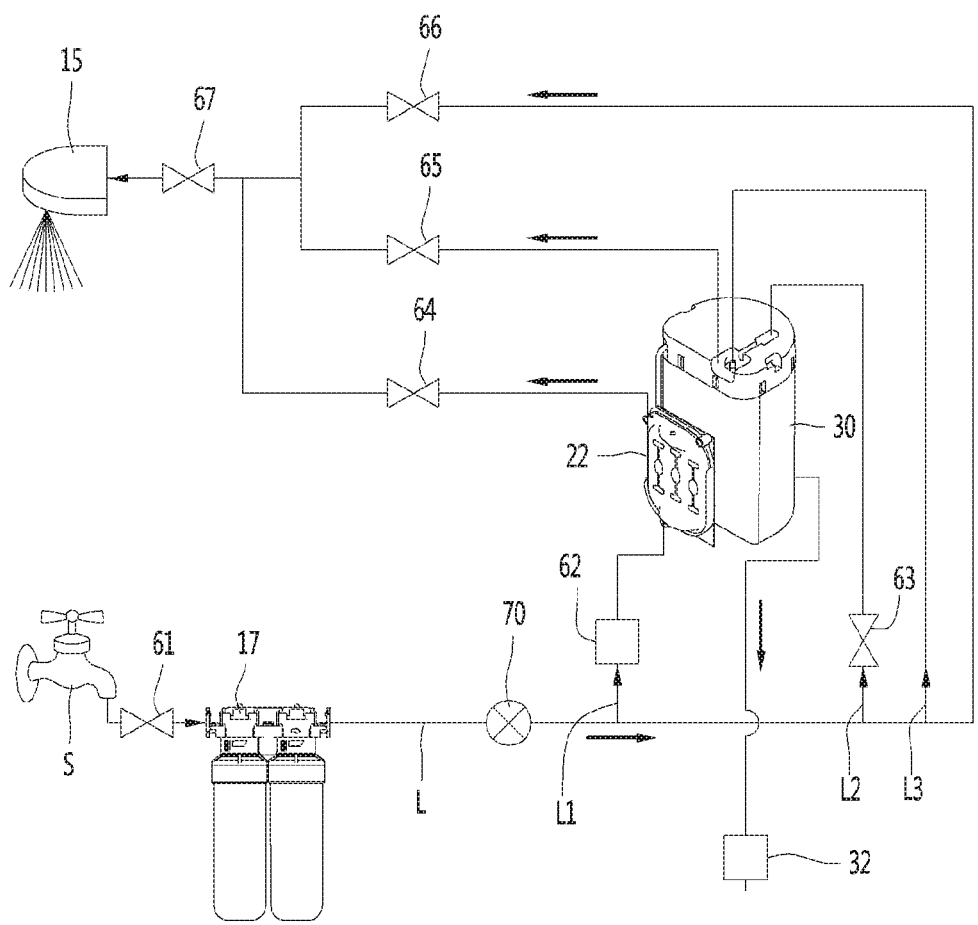
FIG. 5 is a system diagram illustrating a water flow channel connected to a water purifier according to an embodiment of the present disclosure.

FIG. 5 is a system diagram illustrating a water flow channel connected to a water purifier according to an embodiment of the present disclosure.

Referring to FIG. 5, a water supply line L can be formed from a water source S to the water chute 15 of the water purifier 10, and various valves and water purification components can be connected to the water supply line L.

In detail, the water supply line L can be connected to the water source S, for example, a water tap in a home, and the filter assembly 17 can be disposed at any point of the water supply line L to filter impurities contained in drinking water supplied from the water source S.

A flow sensor 70 can be disposed at the water supply line L connected to an outlet end of the filter assembly 17. Thus, a water supply valve 61 can be controlled to be closed when a supply rate detected by the flow sensor 70 reaches a setting flow rate.

A hot water supply line L1, a cold water supply line L2, and a cold water supply line L3 can be branched at any point of the water supply line L that extends from the outlet end of the flow sensor 70.

A filtered water ejection valve 66 can be installed at an end of the water supply line L that extends from the outlet end of the flow sensor 70, and a hot water ejection valve 64 can be installed at an end of the hot water supply line L1.

A cold water ejection valve 65 can be installed at an end of the cold water supply line L3, and a cold water valve 63 can be installed at any point of the cold water supply line L2.

In detail, the cold water valve 63 can be installed at any point of the cold water supply line L2 to adjust the amount of cold water supplied to a cold water tank 33.

A water supply line that extends from an outlet end of the hot water ejection valve 64, the cold water ejection valve 65, and the filtered water ejection valve 66 can be connected to the water chute 15. As shown in the drawings, the water supply line can be configured to connect filtered water, cold water, and hot water to a single water outlet or can be configured to connect them to independent water outlets, respectively.

Although a water discharge valve 32 is illustrated to be installed on a water supply line that extends out of a cold water generator 30 in the drawings, the actual water discharge valve 32 can be inserted into an insulation case 31 to penetrate the same, as described with reference to FIG. 5.

A flow rate adjusting valve 62 can be installed at any point of the hot water supply line L1, and a hot water heater 22 can be connected to the hot water supply line L1 that extends at an outlet end of the flow rate adjusting valve 62. The hot water ejection valve 64 can be installed at any point of the hot water supply line L that extends at the outlet end of the hot water heater 22.

When supplied water flows along the hot water supply line L1 and passes through the hot water heater 22, the water can be heated at a setting temperature, and when a hot water selection button is pushed to open the hot water ejection valve 64, hot water can be ejected.

The hot water supply line L1, the cold water supply line L2, and the cold water supply line L3 can be recombined to a single line. An ejection valve 67 can be installed on the single line.

When the ejection valve 67 is opened under control of the processor, water (which is filtered water obtained by filtering source water) can be discharged to the outside through the water outlet.

When the water supply valve 61 is opened under control of the processor, water (source water) can be supplied to the filter assembly from the water source.

The processor described below can refer to an element for controlling an operation of the water purifier 10 according to an embodiment of the present disclosure. The processor can receive a detection signal transmitted from various sensors such as a temperature sensor, can receive a command signal such as a cold water ejection command, and can generate and transmit a new command based on the received pieces of information.

The water supply line L can include a water supply pipe for connecting the water source S and the filter assembly 17. The water supply valve 61 can be installed at a water supply pipe. When the water supply valve 61 is opened under control of the processor, water (source water) can be supplied to the filter assembly from the water source.

The water supply line L can include a water discharge pipe for connecting the filter assembly 17 and the water outlet 151. For example, the water discharge pipe can include the hot water supply line L1, the cold water supply line L2, and the cold water supply line L3.

The ejection valve 67 can be installed at the water discharge pipe. When the ejection valve 67 is opened under control of the processor, water (which is filtered water generated by filtering source water) can be discharged to the outside through the water outlet.

The water purifier can include all or some of the components of the AI device 100 described with reference to FIG. 1, and can perform a function performed by the AI device 100.

The term "water purifier" can be interchangeably used with the term "AI water purifier".

The processor can control an operation of the water purifier.

Figure 6:
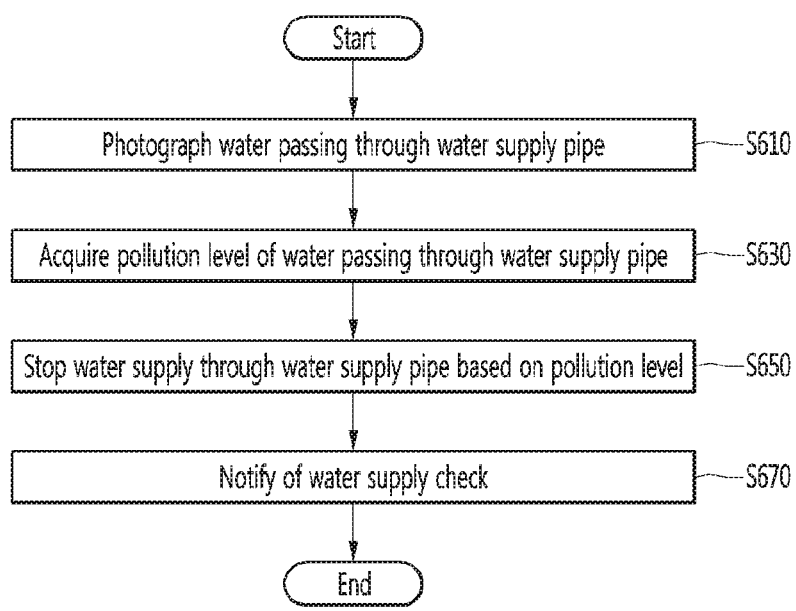
FIG. 6 is a view for explaining an operation method of an AI water purifier.

FIG. 6 is a view for explaining an operation method of an AI water purifier.

The operation method of the AI water purifier can include photographing (i.e., capturing) water passing through a water supply pipe (S610), acquiring a pollution level of the water passing through the water supply pipe (S630), stopping the supply of the water passing through the water supply pipe based on a pollution level (S650), and outputting notification of a water supply check (S670).

FIG. 7 is a view for explaining a water supply pipe and a supplied water quality management module.

Figure 8:
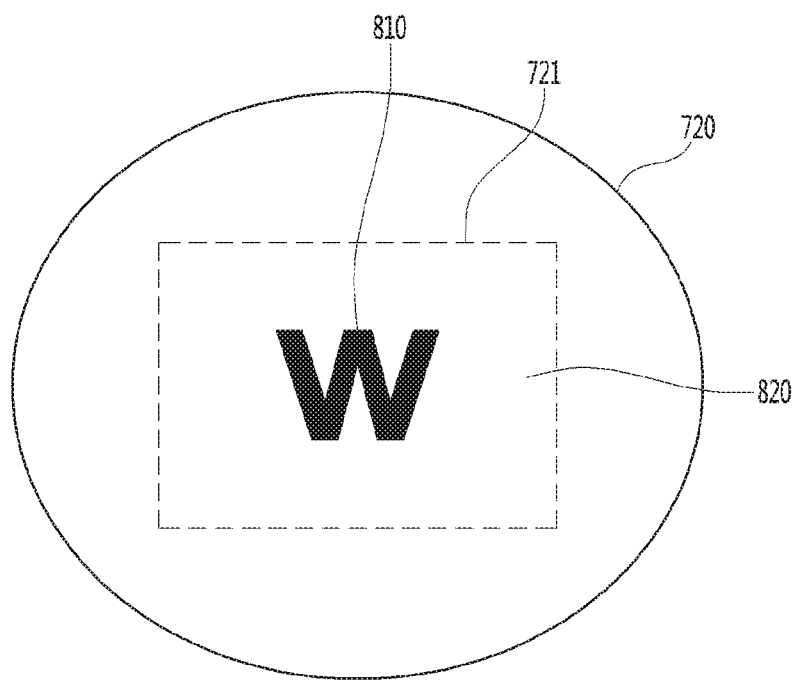
FIG. 8 is a plan view of a photography surface and a photography area formed on an inner surface of a water supply pipe.

FIG. 8 is a plan view of a photography surface and a photography area formed on an inner surface of a water supply pipe.

The supplied water quality management module can include a first camera 760. Here, the first camera 760 can photograph (i.e., capture) water passing through the water supply pipe.

First, a shape of a water supply pipe 700 will be described.

The water supply pipe 700 can have a cylindrical shape and a partial surface of the water supply pipe 700 can be transparent. A region of the water supply pipe 700, which is formed to be transparent, can be referred to as a transparent region 710. Thus, the inner surface opposing the transparent region 710 can be seen through the transparent region 710.

The first camera 760 can be installed outside the water supply pipe. The first camera 760 can be installed to see the inside of the water supply pipe 700 through the transparent region 710 in order to photograph the water passing through the water supply pipe.

A photography surface 720 can be formed on an inner surface 741 of the water supply pipe 700. Here, the photography surface 720 can be formed at a position opposing the transparent region 710.

When the first camera 760 is installed to see the inside of the water supply pipe through the transparent region 710, the photography surface 720 can be formed toward a photography direction of the first camera 760. Thus, the photography surface 720 can be formed at a position opposing the first camera 760.

Thus, the first camera 760 can be disposed outside the water supply pipe, and can perform photography to overlap a photography area 721, water passing through the photography area 721, and the transparent region 710 with one another.

The inner surface 741 of the water supply pipe 700 can include the photography area 721. Here, the photography area 721 can refer to a region that is formed on the inner surface of the water supply pipe 700 and is photographed by the first camera 760.

The photography area 721 can be formed on the photography surface 720. Thus, the photography area 721 can also be formed at a position opposing the transparent region 710 and the first camera 760.

The photography surface 720 can be formed on the inner surface of the water supply pipe 700, and the photography area 721 can be formed on the photography surface 720, but the present disclosure is not limited thereto. For example, without the separate photography surface 720, the photography area 721 can be formed on a portion of the inner surface of the water supply pipe 700. However, in this case, the photography area 721 can also be disposed to oppose the transparent region 710, and the photography area 721 can also be disposed to oppose the first camera 760.

The photography area 721 can be formed to be opaque. In detail, the photography surface 720 can be formed of an opaque material, and thus the photography area 721 can also be formed to be opaque.

When the photography surface 720 is not present, the inner surface of the water supply pipe 700, on which the photography area 721 is formed, can be formed of an opaque material.

The water supply pipe 700 can include a sensor hole 750. A water quality sensor 770 can be inserted into the sensor hole 750, and the inserted water quality sensor 770 can directly contact water to acquire data for determining water quality.

Referring to FIG. 8, the photography area 721 can include a mark 810.

In detail, the mark 810 can be formed on the photography surface 720, and when the photography surface 720 is not present, the mark 810 can be directly formed on the inner surface of the water supply pipe 700.

The mark 810 can include a numeral, a character, a cover, a sign, an image, a taste, or the like as a shape for indicating predetermined information.

The photography area 721 can include a background region 820. Here, the background region can refer to a region of the photography area 721, on which the mark 810 is not formed. The background region 820 can have single color.

The background region 820 can be formed on the photography surface 720, but the present disclosure is not limited thereto, and when the photography surface 720 is not present, the background region 820 can be directly formed on the inner surface of the water supply pipe 700.

The processor can control the first camera to photograph the water passing through the water supply pipe, and can determine a pollution level of the water passing through the water supply pipe using an image captured by photographing the water passing through the water supply pipe.

Information related thereto will be described with reference to FIGS. 9 to 11.

FIGS. 9 to 11 are views for explaining a method of determining a pollution level using an image captured by photographing water.

The processor can acquire at least one of transparency or color of water passing through a water supply pipe using the image captured by photographing the water passing through the water supply pipe, and can determine a pollution level of the water passing through the water supply pipe using at least one of the transparency or the color.

First, a method of acquiring transparency of water will be described with reference to FIGS. 9 to 10.

The transparency of water can be determined based on at least one of the sharpness of water or impurities in water.

First, the sharpness of water will be described. Here, the term 'sharpness' can be interchangeably used with the term 'definition'.

Here, the sharpness can refer to a degree by which a subject or image displayed on a monitor is clear. The sharpness can indicate a clear degree at a boundary between dark and light of the image. The sharpness can refer to a degree by which the image is clear and light.

When water passing through the water supply pipe has good water quality, if the inside of the water supply pipe is seen through the transparent region, an opposite wall needs to be clearly seen. For example, as shown in FIG. 9A, a mark 921 formed on the photography area can be clearly seen in an image 910 captured in a state in which water quality of water passing through the water supply pipe is good.

In contrast, when water with large amount of impurities passes through the water supply pipe, an opposite wall may not be clearly seen and a blurry shape can be seen. For example, as shown in FIG. 9B, a mark 922 formed on the photography area can be unclearly seen in an image 920 captured in a state in which water quality of the water passing through the water supply pipe is not good.

Thus, the processor can determine the transparency of water passing through the water supply pipe using the sharpness of the image captured by photographing the water passing through the water supply pipe.

In detail, when photography is performed using the first camera, photography can be performed to overlap the water passing through the photography area and the mark 922 included in the photography area with each other.

The processor can acquire the sharpness of the mark 922 using the image captured to overlap the water passing through the photography area and the mark 922 with each other.

In detail, the processor can acquire the sharpness of the mark 922 using the color of the mark 922, a clear degree at a boundary of the mark 922, gradation at a boundary of the mark 922, or the like.

The processor can determine the transparency of the water passing through the water supply pipe of the sharpness of the mark 922. For example, when sharpness is high, the transparency of water can also be determined to be high, and when the sharpness is low, the transparency of water can also be determined to be low.

A phenomenon whereby a photography area is burred due to pollution of water can be similar to a phenomenon caused in the case of focusing-out of a camera. Thus, the processor can determine sharpness using a focus out detection algorithm of a camera.

Hereinafter, a method of determining transparence based on impurities in water will be described.

When water quality of the water passing through the water supply pipe is good, the amount of impurities in water is low. For example, as shown in FIG. 10A, impurities may not be detected and a small amount of impurities can be detected in an image 1010 captured in a state in which water quality of water passing through the water supply pipe is good.

In contrast, when water with a high pollution level passes through the water supply pipe, a large amount of impurities is high. For example, as shown in FIG. 10B, impurities can be detected or a large amount of impurities 1021 can be detected in an image 1020 captured in a state in which water quality of water passing through the water supply pipe is not good.

Thus, the processor can detect impurities using an image captured by photographing water passing through the photography area and can determine the transparency of the water passing through the water supply pipe based on the impurities.

In detail, the processor can detect impurities from a captured image and can determine the amount of the detected impurities.

The processor can determine the transparency of the water passing through the water supply pipe based on the amount of impurities. For example, when a small amount of impurities is present, the transparency of water can be determined to be high, and when a large amount of impurities is high, the transparency of water can be determined to be low.

The processor can detect impurities in a background region of single color, and can determine the transparency of water passing through the water supply pipe based on the impurities. In this case, the background region can be white.

That is, when the background region has single color (in particular, when the background region is white), impurities can be more easily detected, and thus, the processor can detect impurities in the background region of single color.

There is a camera occlusion detection algorithm of detecting a camera lens to be hidden by the hand or other objects through the captured image. A phenomenon caused when impurities are contained in water is similar to a phenomenon whereby the camera lens is hidden. Thus, the processor can determine the amount of impurities in water using the camera occlusion detection algorithm.

The processor can determine a pollution level of water using the transparency of water. For example, when the transparency of water is high, a pollution level of water can be determined to be low, and when the transparency of water is low, the pollution level of water can be determined to be high.

The processor can determine a pollution level of the water passing through the water supply pipe using at least one of the transparency or color of water. The transparency of water has been described with reference to FIGS. 9 to 10, and thus a method of determining a pollution level using the color of water will be described with reference to FIG. 11.

Hereinafter, a method of determining a pollution level using color of water will be described with reference to FIG. 11.

When water quality of water passing through the water supply pipe is good, water can have constant color. For example, as shown in FIG. 11A, a background region can represent color of the photography surface 720 in an image 1110 captured in a state in which image quality of the water passing through the water supply pipe is good. When the photography area is directly formed in the inner surface of the water supply pipe, the background region can represent the color of the inner surface of the water supply pipe.

In contrast, when water with a high pollution level passes through the water supply pipe, the color of water can be changed. For example, as shown in FIG. 11B, a background region can represent different color from the photography surface 720 in an image 1210 captured in a state in which water with a high pollution level, such as rust, passes. When the photography area is directly formed on the inner surface of the water supply pipe, the background region can represent difference color from the inner surface of the water supply pipe in the captured image 1210.

Thus, the processor can detect the color of an image using an image captured by photographing water passing through the photography area.

The processor can determine a pollution level of water using a variation of color of an image.

For example, when the variation of the color of the image is higher than in a normal state (when a pollution level of water is equal to or less than a reference value), the pollution level of water can be determined to be high, and when the variation of the color of the image is lower than in the normal state, the pollution level of water can be determined to be low.

The processor can detect color in the background region of single color and can determine a pollution level of water based on the detected color. In this case, the background region can be white.

That is, when the background region has single color (in particular, when the background region is white), a color variation is more easily detected, and thus the processor can detect color in the background region of single color (in particular, white).

Figure 12:
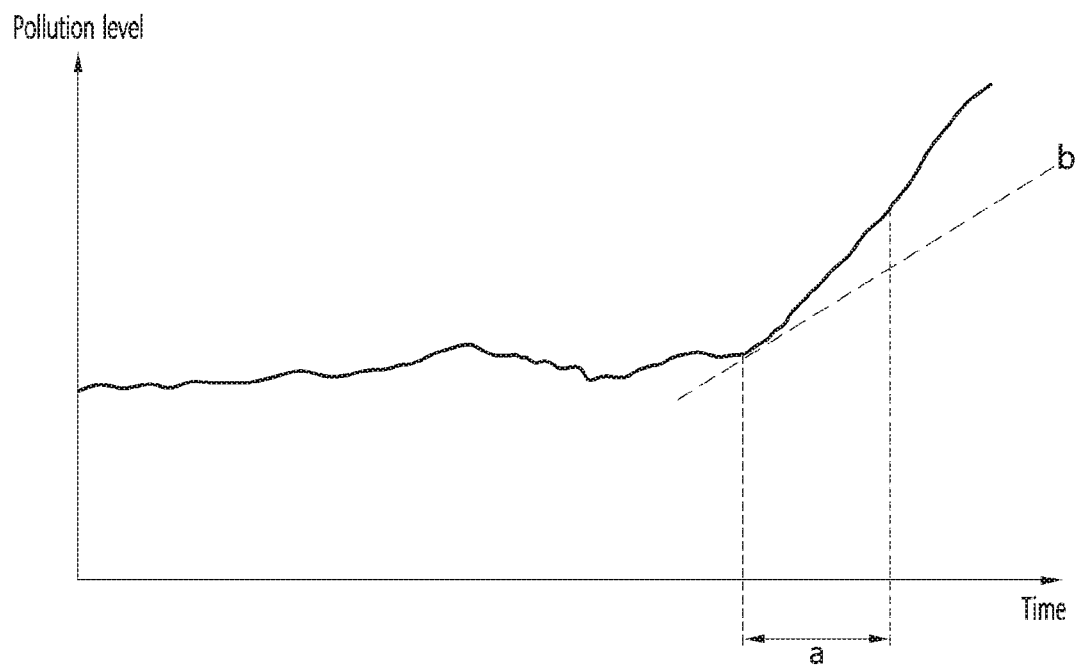
FIG. 12 is a view for explaining a method of giving a warning or stopping an operation depending on a pollution level of water passing through a water supply pipe.

FIG. 12 is a view for explaining a method of giving a warning or stopping an operation depending on a pollution level of water passing through a water supply pipe.

The processor can stop water supply or can output notification of water supply check depending on a pollution level of water passing through the water supply pipe.

In detail, the processor can stop water supply or can output notification of water supply check when a rate of rise of a pollution level of water passing through the water supply pipe is equal to or greater than a preset value.

Here, the rate of rise of the pollution level of water can refer to an amount of rise per unit time (a) of the pollution level, that is, a rising inclination of the pollution level. The preset value can refer to a reference inclination (b).

When an amount of rise per unit time (a) of a pollution level is equal to or greater than a preset value, the processor can stop water supply or can output notification of water supply check.

The processor can control the water supply valve 61 to be closed, and thus can stop water supply from the water source to the filter assembly through the water supply pipe. As another method, the processor can stop an operation of a pump for circulating water, and thus can stop water supply from the water source to the filter assembly through the water supply pipe.

The processor can control an output interface to output notification of water supply check or can output notification of water supply check using a method of transmitting the notification of water supply check to a terminal of the user.

As such, according to the present disclosure, it can be advantageous that water quality is directly measured by the water purifier. In addition, water quality is measured using the camera, and thus manufacturing costs can be advantageously reduced.

According to the present disclosure, the water supply pipe measures a pollution level and water supply to a filter array can be blocked when contamination occurs, and thus a pollutant supplied to the filter can be previously blocked. Thus, according to the present disclosure, it can be advantageous that the lifespan of the filter is largely reduced due to the pollutant or non-filtering of the pollutant can be prevented.

The water purifier can be a device for filtering a pollutant, and thus water supplied from the water source contains pollutant. With regard to a degree by which a pollution level slightly rises, the water purifier can be capable of sufficiently purifying water. However, according to the present disclosure, when a rate of rise of a pollution level is equal to or greater than a preset value (that is, when a large amount of pollutant is rapidly input), supply of the pollutant is blocked, and thus an operation of the water purifier can be stopped only if necessary (when the lifetime of a filter needs to be prevented from being reduced or non-filtering of the pollutant needs to be prevented).

According to the present disclosure, the pollution level is detected using the marker and the background region, and thus the accuracy of detection can be advantageously enhanced.

According to the present disclosure, the water supply pipe can be configured to be partially transparent, and the camera is disposed outside the water supply pipe, and thus, it can be possible to use a camera that is not waterproof, thereby reducing manufacturing costs.

According to the present disclosure, a pollution level can be detected using a pre-present algorithm (a focusing-out detection algorithm, or a camera occlusion detection algorithm), and thus manufacturing costs can be advantageously reduced.

Pollution level detection can also be performed by a water quality sensor as well as a camera.

In detail, the water purifier can include a water quality sensor for acquiring data for determining water quality.

The processor can determine the second pollution level of the water passing through the water supply pipe using the ingredient level in water, acquired based on the data. A method of determining a pollution level using an ingredient level acquired using the water quality sensor is a related art, and thus a detailed description thereof is not omitted.

When the rate of rise of the pollution level, acquired using the first camera, is equal to or greater than a preset value or the rate of rise of the second pollution level is equal to or greater than a second preset value, the processor can stop water supply through the water supply pipe and can output notification of water supply check.

That is, according to the present disclosure, any one of the image analysis result and a sensing value of the water quality sensor is abnormal, it can be determined that contamination occurs, and thus the accuracy of detection of contamination can be advantageously enhanced. In particular, both the image analysis result and the water quality sensor are used, and thus the water quality sensor with relatively low performance can be used, thereby advantageously reducing manufacturing costs.

Figure 13:
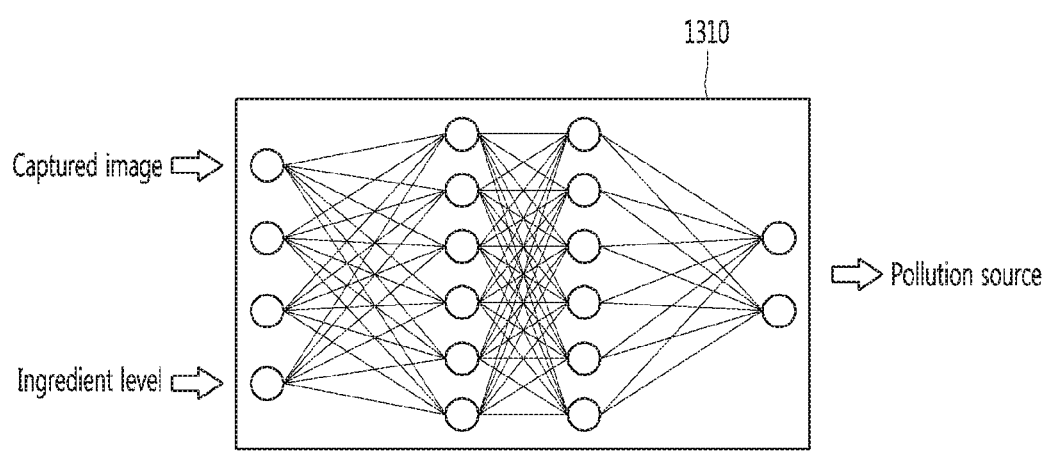
FIG. 13 is a view for explaining a method of determining a pollution source.

FIG. 13 is a view for explaining a method of determining a pollution source.

The processor can determine a pollution source using the image captured by photographing water passing through the water supply pipe and the ingredient level in water, acquired based on the water quality sensor, and can output information indicating the pollution source.

In this case, the processor can determine the pollution source using a pollution source detection model.

Here, a pollution source detection model 1310 can be a neural network trained using data for training purposes, including an image captured by photographing the water passing the water supply pipe and an ingredient level, and a pollution source for training purposes, labeled on the data for training purposes.

In detail, the learning device 200 can train a neural network by labeling a pollution source for training purposes on training data including the image captured by photographing the water passing through the water supply pipe and the ingredient level.

In more detail, the learning device 200 can train a neural network using, as an input, an image (an image captured by photographing watering passing through the water supply pipe for training purposes) for training purposes and an ingredient level (an ingredient level detected by a water quality sensor in a state in which the image for training purposes is captured) for training purposes, and using, as an output value, a pollution source (a pollutant contained in water in a situation in which the image for training purposes, e.g., rust) for training purposes.

Here, the pollution source for training purposes can be an answer to be inferred using the image for training purposes and the ingredient level for training purposes by the neural network.

In this case, the neural network can infer a function of a correlation between labeling data and data for training purposes using the labeling data and the data for training purposes. Through evaluation of the function inferred by the neural network, a parameter (a weight, bias, or the like) of the neural network can be determined (optimized).

The neural network trained using the above method can be referred to as the pollution source detection model 1310.

The pollution source detection model 1310 can be installed in the water purifier.

In detail, the pollution source detection model 1310 can be embodied in hardware, software, or a combination of hardware and software. When the pollution source detection model 1310 is entirely or partially embodied in software, one or more commands configuring an AI model can be stored in a memory of the water purifier.

The processor 180 can provide the image captured by photographing water passing through the water supply pipe and the ingredient level acquired by the water quality sensor to the pollution source detection model 1310, and thus can acquire the pollution source output by the pollution source detection model.

In detail, the pollution source detection model 1310 can extract a feature vector from the image captured by photographing the water passing through the water supply pipe and the ingredient level acquired by the water quality sensor, based on the set parameter, and can output a pollution source corresponding to input data based on the feature vector.

When acquiring the pollution source, the processor 180 can output information indicating the pollution source. For example, the processor can control a speaker to output a voice message "Rust is detected".

The aforementioned structure and algorithm can also be applied to the water discharge pipe. Hereinafter, the structure and operation of the water discharge pipe will be described in terms of a difference from those of the water supply pipe.

A discharged water quality management module can include a second camera. Here, the second camera can photograph water passing through the water discharge pipe.

The processor can acquire at least one of the transparency and color of the water passing through the water discharge pipe using the image captured by photographing the water passing through the water discharge pipe, and can determine a pollution level of the water passing through the water discharge pipe using at least one of the transparency or the color.

Figure 14:
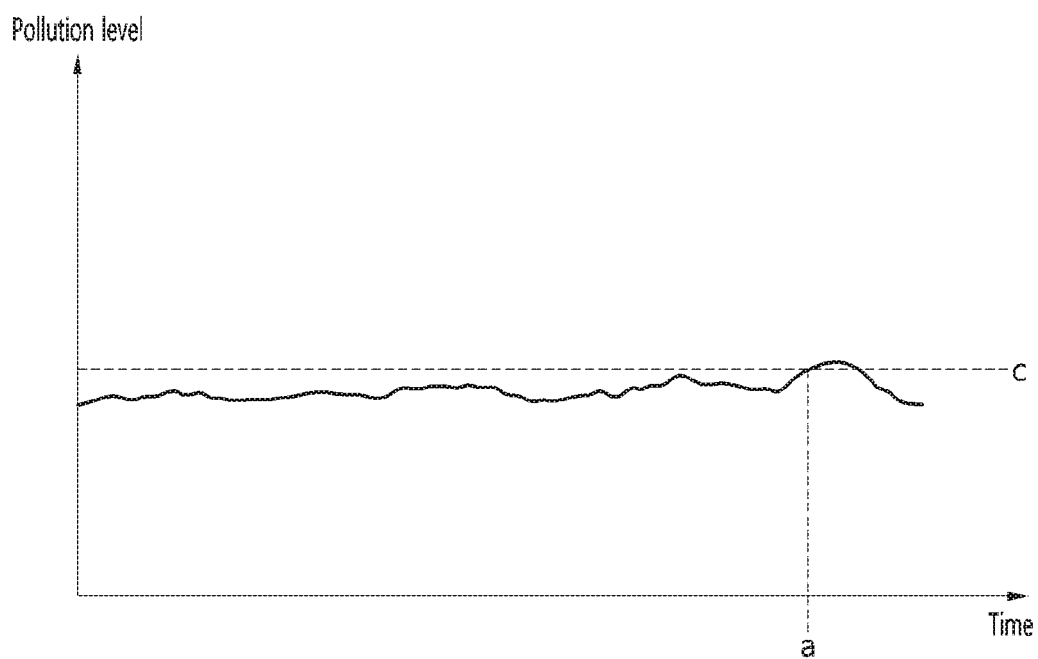
FIG. 14 is a view for explaining a method of stopping water discharge in a water discharge pipe or outputting notification of discharged water check.

FIG. 14 is a view for explaining a method of stopping water discharge in a water discharge pipe or outputting notification of discharged water check.

The processor can stop water discharge or can output notification of discharged water check based on the pollution level of the water passing through the water discharge pipe.

In detail, when the pollution level of the water passing through the water discharge pipe is equal to or greater than a preset value, the processor can stop water discharge or can output discharged water check.

As described above, water supply can be stopped or notification of water supply check can be output based on the rate of rise of a pollution level of water in the water discharge pipe. This is needed to prevent the lifetime of a filter or to prevent non-filtering of a pollutant because a large amount of pollutant is remarkably injected.

However, the objective of the water discharge pipe can be not to provide contaminated water to a user. Thus, when the pollution level of water passing through the water discharge pipe is equal to or greater than a preset value, the processor can stop water discharge or can output notification of discharged water check.

The processor can control the ejection valve 67 to be closed, and thus water discharge through the water outlet can be stopped. As another method, the processor can stop an operation of a pump for circulating water, and thus the water can be prevented from being discharged through the water outlet.

The processor can control the an output interface to output notification of water discharge check or can output notification of water discharge check using a method of transmitting the notification of water discharge check to a terminal of the user.

Hereinafter, a method of determining a pollution level of an AI water purifier will be described. The method of determining the pollution level of the AI water purifier can include photographing water passing through a water supply pipe configured to connect a water source and a filter assembly, acquiring at least one of transparency or color of the water passing through the water supply pipe using an image captured by photographing the water passing through the water supply pipe, and determining a pollution level of the water passing through the water supply pipe using at least one of the transparency or the color.

In this case, the method can further include stopping supply of water through the water supply pipe when a rate of rise of the pollution level is equal to or greater than a preset value.

The water supply pipe can include a photography area photographed by the first camera.

In this case, the photography area can include a mark, and the acquiring at least one of the transparency or the color of the water can include acquiring sharpness of the mark using an image captured to overlap water passing through the photography area with the mark and determining the transparency using the sharpness of the mark.

The acquiring at least one of the transparency or color of the water can include detecting impurities using an image captured by photographing the water passing through the photography area and determining the transparency based on the impurities.

The water supply pipe can include a transparent region formed to oppose the photography area and to be transparent, and the photographing the water passing through the water supply pipe can include performing photography to overlap the photography area, the water passing the photography area, and the transparent region with one another using a first camera disposed outside the water supply pipe.

The method of determining the pollution level of the AI water purifier can further include acquiring an ingredient level in water based data collected by a water quality sensor, determining a second pollution level of the water passing through the water supply pipe using the ingredient level in the water, and stopping supply of water through the water supply pipe when the rate of rise of the pollution level is equal to or greater than a preset value or a rate of rise of the second pollution level is equal to or greater than a second preset value.

In this case, the method can further include determining a pollution source using the image captured by photographing the water passing through the water supply pipe and the ingredient level, and outputting information indicating the pollution source.

According to the present disclosure, it can be advantageous that the water purifier advantageously measures water quality. In addition, water quality is measured using the camera, and thus manufacturing costs can be advantageously reduced.

According to the present disclosure, the water supply pipe measures a pollution level and water supply to a filter array can be blocked when contamination occurs, and thus a pollutant supplied to the filter can be previously blocked. Thus, according to the present disclosure, it can be advantageous that the lifespan of the filter is largely reduced due to the pollutant or non-filtering of the pollutant can be prevented.

The above-described present disclosure can be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMS), compact disc read only memories (CD-ROMs), magnetic tapes, floppy discs, and optical data storage devices. Also, the computer can include a control unit 180 of the terminal.

Therefore, the detailed description is intended to be illustrative, but not limiting in all aspects. It is intended that the scope of the present disclosure should be determined by the rational interpretation of the claims as set forth, and the modifications and variations of the present disclosure come within the scope of the appended claims and their equivalents.

What is claimed is:

1. An artificial intelligence (AI) water purifier, comprising:
    a housing forming an outer surface of the AI water purifier;
    a filter assembly disposed inside the housing;
    a water outlet configured to discharge water;

a water supply pipe configured to connect a water source to the filter assembly;
a water discharge pipe configured to connect the filter assembly to the water outlet;
a camera configured to capture an image of water passing through the water supply pipe; and
a processor configured to:
acquire at least one of transparency of the water or color of the water passing through the water supply pipe using the captured image, and
determine a first pollution level of the water passing through the water supply pipe using the at least one of the transparency of the water or the color of the water,
wherein an inner surface of the water supply pipe includes a photography area,
wherein the captured image includes the photography area,
wherein the photography area includes a mark, and
wherein the processor is further configured to determine the transparency of the water using the mark.

2. The AI water purifier of claim 1, further comprising a water supply valve,
wherein the processor is further configured to control the water supply valve to stop supply of the water through the water supply pipe when a rate of increase of the first pollution level is equal to or greater than a preset value.

3. The AI water purifier of claim 1,
wherein the processor is further configured to:
acquire sharpness of the mark using the captured image, wherein the captured image includes the water passing through the water supply pipe overlapping the mark.

4. The AI water purifier of claim 1, wherein the processor is further configured to:
detect impurities in the water using the captured image, the captured image including the water passing through the photography area, and
determine the transparency of the water based on the detected impurities in the water.

5. The AI water purifier of claim 1, wherein the photography area includes a background region of a single color, and
wherein the processor is further configured to detect the color of the water in the background region.

6. The AI water purifier of claim 1, wherein the water supply pipe includes a transparent region opposite to the photography area, wherein the transparent region is transparent, and
wherein the camera is disposed outside the water supply pipe and is disposed overlapping the transparent region of the water supply pipe, and
wherein the captured image includes the transparent region overlapping the water passing through the water supply pipe and overlapping the photography area.

7. The AI water purifier of claim 2, further comprising:
a water quality sensor configured to acquire data for determining water quality of the water passing through the water supply pipe,
wherein the processor is further configured to:
determine a second pollution level of the water passing through the water supply pipe using an ingredient level of the water, acquired based on the data from the water quality sensor, and
stop supply of water through the water supply pipe, by controlling the water supply valve, when the rate of increase of the first pollution level is equal to or greater than the preset value or a rate of increase of the second pollution level is equal to or greater than a second preset value.

8. The AI water purifier of claim 7, wherein the processor is further configured to:
acquire a pollution source using the captured image and the ingredient level of the water, and
output information indicating the pollution source.

9. The AI water purifier of claim 8, wherein the processor acquires the pollution source by transmitting the captured image and the ingredient level of the water to a pollution source detection model and receiving the pollution source from the pollution source detection model, and
wherein the pollution source detection model is a neural network trained using training data including at least one of a second image acquired by capturing water passing through the water supply pipe, an ingredient level as input data, and a pollution source as output data.

10. An artificial intelligence (AI) water purifier, comprising:
a housing forming an outer surface of the water purifier;
a water outlet configured to discharge water;
a water supply pipe configured to be connected to a water source, the water supply pipe including a transparent region that is transparent;
a water discharge pipe connected to the water outlet;
a camera overlapping the transparent region of the water supply pipe, the camera being configured to capture at least one image of the transparent region overlapping water passing through the water supply pipe; and
a processor configured to determine a pollution level of the water passing through the water supply pipe using the at least one captured image and a neural network.

11. The AI water purifier of claim 10, wherein the neural network is a pollution source detection model that is trained using training data, the training data including at least one of a second image acquired by capturing water passing through the water supply pipe, an ingredient level as input data, and a pollution source as output data.

12. A method of determining a pollution level of an artificial intelligence (AI) water purifier, the method comprising:
providing the AI water purifier, the AI water purifier including:
a housing including a filter assembly;
a water supply pipe connecting a water source to the filter assembly; and
a camera;
capturing by the camera, an image of water passing through the water supply pipe;
acquiring at least one of transparency of the water or color of the water passing through the water supply pipe using the captured image; and
determining a first pollution level of the water passing through the water supply pipe using the at least one of the transparency of the water or the color of the water,
wherein an inner surface of the water supply pipe includes a photography area,
wherein the captured image includes the photography area,
wherein the photography area includes a mark, and
wherein the acquiring at least one of the transparency of the water or the color of the water includes:
determining the transparency using the mark.

13. The method of claim 12, wherein the AI water purifier further includes a water supply valve, and wherein the method further comprises stopping supply of water through the water supply pipe, by controlling the water supply valve, when a rate of increase of the first pollution level is equal to or greater than a preset value.

14. The method of claim 12,
wherein the acquiring at least one of the transparency of the water or the color of the water includes:
acquiring sharpness of the mark using the captured image, wherein the captured image includes the water overlapping the mark.

15. The method of claim 12, wherein the acquiring at least one of the transparency of the water or the color of the water includes:
detecting impurities in the water using the captured image, the captured image including the water passing through the photography area; and
determining the transparency based on the impurities in the water.

16. The method of claim 12, wherein the water supply pipe includes a transparent region opposite to the photography area, wherein the transparent region is transparent,
wherein the camera is disposed outside the water supply pipe overlapping the transparent region of the water supply pipe, and
wherein the captured image includes the transparent region overlapping the water passing through the water supply pipe and overlapping the photography area.

17. The method of claim 13, wherein the AI water purifier further comprises a water quality sensor, and
wherein the method further comprises:
acquiring an ingredient level of the water based data collected by the water quality sensor;
determining a second pollution level of the water passing through the water supply pipe using the ingredient level in the water; and
stopping supply of water through the water supply pipe, by the controlling the water supply valve, when the rate of increase of the pollution level is equal to or greater than the preset value or a rate of increase of the second pollution level is equal to or greater than a second preset value.

18. The method of claim 17, further comprising:
determining a pollution source using the captured image and the ingredient level; and
outputting information indicating the pollution source.

* * * * *